(12) United States Patent
Craig et al.

(10) Patent No.: US 11,100,085 B2
(45) Date of Patent: Aug. 24, 2021

(54) SYSTEMS AND METHODS FOR VALIDATING DATABASE INTEGRITY

(71) Applicant: MASTERCARD INTERNATIONAL INCORPORATED, Purchase, NY (US)

(72) Inventors: Bryan S. Craig, Foristell, MO (US); Charlene Marie Spaeth, Dardenne Prairie, MO (US); Frederick Joseph Zarf, Lake St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 215 days.

(21) Appl. No.: 16/110,533

(22) Filed: Aug. 23, 2018

(65) Prior Publication Data

US 2020/0065410 A1    Feb. 27, 2020

(51) Int. Cl.
*G06F 16/23*    (2019.01)
*G06F 16/27*    (2019.01)
*G06F 16/28*    (2019.01)
*G06F 16/22*    (2019.01)

(52) U.S. Cl.
CPC ...... *G06F 16/2365* (2019.01); *G06F 16/2282* (2019.01); *G06F 16/27* (2019.01); *G06F 16/284* (2019.01)

(58) Field of Classification Search
None
See application file for complete search history.

(56) References Cited

U.S. PATENT DOCUMENTS

| | | | | |
|---|---|---|---|---|
| 9,002,801 B2* | 4/2015 | Meehan | ................ | G06F 16/27 707/665 |
| 9,037,685 B2* | 5/2015 | Welingkar | ............ | H04L 67/325 709/220 |
| 9,922,074 B1* | 3/2018 | Hoffmann | ............. | G06F 16/275 |
| 2009/0106603 A1* | 4/2009 | Dilman | ............... | G06F 11/0727 714/42 |
| 2015/0113659 A1* | 4/2015 | D'Costa | ................. | G06F 21/60 726/26 |
| 2017/0308568 A1* | 10/2017 | Laethem | ............. | G06F 16/1873 |
| 2018/0173744 A1* | 6/2018 | Barbas | ................ | G06F 16/2365 |

* cited by examiner

*Primary Examiner* — Alford W Kindred
*Assistant Examiner* — Cao D Vuong
(74) *Attorney, Agent, or Firm* — Harness, Dickey & Pierce, P.L.C.

(57) ABSTRACT

Systems and methods are provided for validating data included in disparate databases. One exemplary method comprises identifying first data of a first database to second data of a second, different database, based on a key name value and a date common to the first and second data, and comparing a value the first data to a value of the second data. The exemplary method further includes generating a report when a difference between the value of the first data and the value of the second data exists, where the report is indicative of the difference in the values, and whereby a user associated with the validation command is permitted to take corrective action to avoid the difference in the values in one or more subsequent loads of data to the first database and/or the second database.

14 Claims, 14 Drawing Sheets

1000

| NDB | NETEZZA TABLE | NTZ_FIELD | NTYPE | NT2 | FILLER | ODB | ORACLE TABLE | OFIELD | OTYPE | OT2 |
|---|---|---|---|---|---|---|---|---|---|---|
| core | MERCHANT_CATEGORY_HIERARCHY | BEGIN_DATE | TIMESTAMP | TS | ### | ora | MERCHANT_CATEGORY_HIERARCHY | BEGIN_DATE | DATE | D |
| core | MERCHANT_CATEGORY_HIERARCHY | END_DATE | TIMESTAMP | TS | ### | ora | MERCHANT_CATEGORY_HIERARCHY | END_DATE | DATE | D |
| core | MERCHANT_CATEGORY_HIERARCHY | UPDATE_DATE | TIMESTAMP | TS | ### | ora | MERCHANT_CATEGORY_HIERARCHY | UPDATE_DATE | DATE | D |

| CLASSIFICATION_NAME | MERCHANT_CATEGORY_CODE | MERCHANT_CATEGORY_NAME | FLAG_1099 | INDUSTRY_CODE | INDUSTRY_NAME | ABBREVIATED_CATEGORY_NAME | AUTH_TRANSACTION_CATEGORY_CODE | UPDATE_DATE |
|---|---|---|---|---|---|---|---|---|
| OTHER SERVICES | 2791 | TYPESETTING PLATE MAKING + RELATED SERVICES | Y | 9 | OTHER | | T | 29-MAR-1996 |
| OTHER SERVICES | 4214 | FREIGHT CARRIER TRUCKING-LCL-LNG DIST MVG-STORAGE | N | 9 | OTHER | | R | 16-OCT-2006 |
| OTHER SERVICES | 4225 | PUBLIC WAREHOUSING-FARM REFRIG GOODS HHG STORAGE | N | 9 | OTHER | | R | 18-SEP-1995 |
| UTILITIES | 4899 | CABLE SATELLITE OTHER PAY TELEVISION RADIO SVCS | N | 9 | OTHER | | R | 29-AUG-2002 |
| OTHER RETAIL | 5094 | PRECIOUS STONES AND METALS WATCHES AND JEWELRY | N | 9 | OTHER | | T | 29-MAR-1996 |
| OTHER RETAIL | 5099 | DURABLE GOODS NOT ELSEWHERE CLASSIFIED | N | 9 | OTHER | | T | 29-MAR-1996 |
| DRUG STORES | 5122 | DRUGS DRUG PROPRIETARIES AND DRUGGIST'S SUPPLIES | N | 9 | OTHER | | R | 16-OCT-2006 |
| HARDWARE | 5211 | BUILDING MATERIALS LUMBER STORES | N | 10 | RETAIL | | R | 16-OCT-2006 |
| FOOD STORES-WAREHOUSE | 5441 | CANDY NUT CONFECTIONERY STORES | N | 10 | RETAIL | | R | 18-SEP-1995 |
| VEHICLES | 5531 | AUTO STORE HOME SUPPLY STORES | N | 10 | RETAIL | | R | 18-SEP-1995 |
| QUASI CASH | 6529 | REMOTE STORED VAL | Y | | | | U | 01-OCT-2004 |
| QUASI CASH | 6530 | REMOTE STORED VAL | Y | | | | U | 01-OCT-2004 |
| QUASI CASH | 6534 | MONEY TRANSFER-ME | Y | | | | U | 01-OCT-2004 |
| AIRLINE | 0004 | AIR CARRIERS AIR | Y | 6 | TRANSPORTATION | | X | 18-APR-2006 |
| UTILITIES | 0006 | UTLS-ELCTRC GAS | Y | 9 | OTHER | | R | 18-APR-2006 |
| PROFESSIONAL SERVICES | 0007 | COMPUTERS COMPUT | Y | 9 | OTHER | | T | 18-APR-2006 |
| SPORTING-TOY STORES | 0029 | GAME TOY AND HO | Y | 10 | RETAIL | | R | 18-APR-2006 |
| OTHER RETAIL | 0030 | GIFT CARD NOVEL | Y | 10 | RETAIL | | R | 18-APR-2006 |
| UTILITIES | 0032 | FUEL DEALERS-COAL | Y | 10 | RETAIL | | R | 18-APR-2006 |
| OTHER SERVICES | 0037 | EQUIPMENT RENTAL+ | Y | 9 | OTHER | | R | 18-APR-2006 |

FIG. 2 (cont.)

| MERCHANT_CATEGORY_HIERARCHY_ID | LEVEL_NAME | LEVEL_NUMBER | BEGIN_DATE | END_DATE | MERCHANT_CATEGORY_HIER_NAME | MCC_GROUP_TYPE_ID | MCC_GROUP_TYPE_NAME | MERCHANT_MCC_GROUP_ID | MERCHANT_MCC_GROUP_NAME |
|---|---|---|---|---|---|---|---|---|---|
| 41 | MCC Code | 20 | 1996-03-29 00:00:00 | | 2791 TYPESETTING PLATE MAKING + RELATED SERVICES | 1 | MARKETING ROLLUP | 6 | SERVICES |
| 422 | MCC Code | 20 | 2006-10-16 01:01:32 | | 4214 FREIGHT CARRIER TRUCKING-LCL-LNG DIST MVG-STORAGE | 1 | MARKETING ROLLUP | 6 | SERVICES |
| 424 | MCC Code | 20 | 1995-09-18 00:00:00 | | 4225 PUBLIC WAREHOUSING-FARM REFRIG GOODS HHG STORAGE | 1 | MARKETING ROLLUP | 6 | SERVICES |
| 439 | MCC Code | 20 | 2002-08-29 00:00:00 | | 4899 CABLE SATELLITE OTHER PAY TELEVISION RADIO SVCS | 1 | MARKETING ROLLUP | 6 | SERVICES |
| 453 | MCC Code | 20 | 1996-03-29 00:00:00 | | 5094 PRECIOUS STONES AND METALS WATCHES AND JEWELRY | 1 | MARKETING ROLLUP | 4 | RETAIL |
| 454 | MCC Code | 20 | 1996-03-29 00:00:00 | | 5099 DURABLE GOODS NOT ELSEWHERE CLASSIFIED | 1 | MARKETING ROLLUP | 4 | RETAIL |
| 456 | MCC Code | 20 | 2006-10-16 01:01:32 | | 5122 DRUGS DRUG PROPRIETARIES AND DRUGGIST'S SUPPLIES | 1 | MARKETING ROLLUP | 4 | RETAIL |
| 467 | MCC Code | 20 | 2006-10-16 01:01:32 | | 5211 BUILDING MATERIALS LUMBER STORES | 1 | MARKETING ROLLUP | 4 | RETAIL |
| 480 | MCC Code | 20 | 1995-09-18 00:00:00 | | 5441 CANDY NUT CONFECTIONERY STORES | 1 | MARKETING ROLLUP | 4 | RETAIL |
| 486 | MCC Code | 20 | 1995-09-18 00:00:00 | | 5531 AUTO STORE HOME SUPPLY STORES | 1 | MARKETING ROLLUP | 4 | RETAIL |
| 1000 | MCC Code | 20 | 2004-10-01 00:00:00 | 2013-10-15 12:57:59 | 6529 REMOTE STORED VALUE LOAD – MEMBER | 1 | MARKETING ROLLUP | 8 | CASH |
| 1001 | MCC Code | 20 | 2004-10-01 00:00:00 | 2013-10-15 12:57:59 | 6530 REMOTE STORED VALUE LOAD – MERCHANT | 1 | MARKETING ROLLUP | 8 | CASH |
| 1105 | MCC Code | 20 | 2004-10-01 00:00:00 | 2013-10-15 12:57:59 | 6534 MONEY TRANSFER-MEMBER | 1 | MARKETING ROLLUP | 8 | CASH |
| 1754 | MCC Code | 20 | 2006-04-18 13:08:00 | | 0004 AIR CARRIERS AIRLINES-NOT ELSEWHERE CLASSIFIED | 1 | MARKETING ROLLUP | 2 | T+E |
| 1756 | MCC Code | 20 | 2006-04-18 13:08:00 | | 0006 UTILS-ELCTRC GAS HEATING OIL SANITARY WATER | 1 | MARKETING ROLLUP | 6 | SERVICES |
| 1757 | MCC Code | 20 | 2006-04-18 13:08:00 | | 0007 COMPUTERS COMPUTER PERIPHERAL EQUIPMENT SOFTWARE | 1 | MARKETING ROLLUP | 6 | SERVICES |
| 1779 | MCC Code | 20 | 2006-04-18 13:08:00 | | 0029 GAME TOY AND HOBBY SHOPS | 1 | MARKETING ROLLUP | 4 | RETAIL |
| 1780 | MCC Code | 20 | 2006-04-18 13:08:00 | | 0030 GIFT CARD NOVELTY AND SOUVENIR SHOPS | 1 | MARKETING ROLLUP | 4 | RETAIL |
| 1782 | MCC Code | 20 | 2006-04-18 13:08:00 | | 0032 FUEL DEALERS-COAL FUEL OIL LIQ PETROLEUM WOOD | 1 | MARKETING ROLLUP | 6 | SERVICES |
| 1787 | MCC Code | 20 | 2006-04-18 13:08:00 | | 0037 EQUIPMENT RENTAL+LEASING SVS FURNITURE-TOOL RENTAL | 1 | MARKETING ROLLUP | 6 | SERVICES |

| MERCHANT_MCC_GROUP_ID | MERCHANT_MCC_GROUP_NAME | CLASSIFICATION_CODE | CLASSIFICATION_NAME | MERCHANT_CATEGORY_CODE | CLASSIFICATION_NAME | FLAG_1099 | INDUSTRY_CODE | INDUSTRY_NAME | ABBREVIATED_CATEGORY_NAME | AUTH_TRANSACTION_CATEGORY_CODE | UPDATE_DATE |
|---|---|---|---|---|---|---|---|---|---|---|---|
| 6 | SERVICES | 6Z | OTHER SERVICES | 2791 | TYPESETTING PLATE MAKING + RELATED SERVICES | Y | 9 | OTHER | | T | 1996-03-29 00:00:00 |
| 6 | SERVICES | 6Z | OTHER SERVICES | 4214 | FREIGHT CARRIER TRUCKING-LCL-LNG DIST MVG-STORAGE | N | 9 | OTHER | | R | 2006-10-16 01:01:32 |
| 6 | SERVICES | 6Z | OTHER SERVICES | 4225 | PUBLIC WAREHOUSING-FARM REFRIG GOODS HHG STORAGE | N | 9 | OTHER | | R | 1995-09-18 00:00:00 |
| 6 | SERVICES | 6O | UTILITIES | 4899 | CABLE SATELLITE OTHER PAY TELEVISION RADIO SVCS | N | 9 | OTHER | | R | 2002-08-29 00:00:00 |
| 4 | RETAIL | 4Z | OTHER RETAIL | 5094 | PRECIOUS STONES AND METALS WATCHES AND JEWELRY | N | 9 | OTHER | | T | 1996-03-29 00:00:00 |
| 4 | RETAIL | 4Z | OTHER RETAIL | 5099 | DURABLE GOODS NOT ELSEWHERE CLASSIFIED | N | 9 | OTHER | | T | 1996-03-29 00:00:00 |
| 4 | RETAIL | 4E | DRUG STORES | 5122 | DRUGS DRUG PROPRIETARIES AND DRUGGIST'S SUPPLIES | N | 9 | OTHER | | T | 2006-10-16 01:01:32 |
| 4 | RETAIL | 4O | HARDWARE | 5211 | BUILDING MATERIALS LUMBER STORES | N | 10 | RETAIL | | R | 2006-10-16 01:01:32 |
| 4 | RETAIL | 4H | FOOD STORES-WAREHOUSE | 5441 | CANDY NUT CONFECTIONERY STORES | N | 10 | RETAIL | | R | 1995-09-18 00:00:00 |
| 4 | RETAIL | 4I | VEHICLES | 5531 | AUTO STORE HOME SUPPLY STORES | N | 10 | RETAIL | | R | 1995-09-18 00:00:00 |
| 8 | CASH | 8B | QUASI CASH | 6529 | REMOTE STORED VALUE LOAD – MEMBER | Y | NULL | | | U | 2004-10-01 00:00:00 |
| 8 | CASH | 8B | QUASI CASH | 6530 | REMOTE STORED VALUE LOAD – MERCHANT | Y | NULL | | | U | 2004-10-01 00:00:00 |
| 8 | CASH | 8B | QUASI CASH | 6534 | MONEY TRANSFER-MEMBER | Y | NULL | | | U | 2004-10-01 00:00:00 |
| 2 | T+E | 2A | AIRLINE^% | 0004 | AIR CARRIERS AIRLINES-NOT ELSEWHERE CLASSIFIED | Y | 6 | TRANSPORTATION | | X | 2006-04-18 13:08:00 |
| 6 | SERVICES | 6O | UTILITIES&% | 0006 | UTLTS-ELCTRC GAS HEATING OIL SANITARY WATER | Y | 9 | OTHER | | R | 2006-04-18 13:08:00 |
| 6 | SERVICES | 6E | PROFESSIONAL SERVICES^%& | 0007 | COMPUTERS COMPUTER PERIPHERAL EQUIPMENT SOFTWARE | Y | 9 | OTHER | | T | 2006-04-18 13:08:00 |
| 4 | RETAIL | 4L | SPORTING-TOY STORES | 0029 | GAME TOY AND HOBBY SHOPS | Y | 10 | RETAIL | | R | 2006-04-18 13:08:00 |
| 4 | RETAIL | 4Z | OTHER RETAIL | 0030 | GIFT CARD NOVELTY AND SOUVENIR SHOPS | Y | 10 | RETAIL | | R | 2006-04-18 13:08:00 |
| 6 | SERVICES | 6O | UTILITIES | 0032 | FUEL DEALERS-COAL FUEL OIL LIQ PETROLEUM WOOD | Y | 10 | RETAIL | | R | 2006-04-18 13:08:00 |
| 6 | SERVICES | 6Z | OTHER SERVICES | 0037 | EQUIPMENT RENTAL+LEASING SVS FURNITURE-TOOL RENTAL | Y | 9 | OTHER | | R | 2006-04-18 13:08:00 |

From FIG. 3

FIG. 3 (cont.)

| MERCHANT_CATEGORY_HIERARCHY_ID | LEVEL_NAME | LEVEL_NUMBER | BEGIN_DATE | END_DATE | MERCHANT_CATEGORY_HIER_NAME | MCC_GROUP_TYPE_ID | MCC_GROUP_TYPE_NAME | MERCHANT_MCC_GROUP_ID | MERCHANT_MCC_GROUP_NAME | CLASSIFICATION_CODE |
|---|---|---|---|---|---|---|---|---|---|---|
| 41 | MCC Code | 20 | 1996-03-29 | | 2791 TYPESETTING PLATE MAKING + RELATED SERVICES | 1 | MARKETING ROLLUP | 6 | SERVICES | 6Z |
| 422 | MCC Code | 20 | 2006-10-16 | | 4214 FREIGHT CARRIER TRUCKING-LCL-LNG DIST WG-STORAGE | 1 | MARKETING ROLLUP | 6 | SERVICES | 6Z |
| 424 | MCC Code | 20 | 1995-09-18 | | 4225 PUBLIC WAREHOUSING-FARM REFRIG GOODS HHG STORAGE | 1 | MARKETING ROLLUP | 6 | SERVICES | 6Z |
| 439 | MCC Code | 20 | 2002-08-29 | | 4899 CABLE SATELLITE OTHER PAY TELEVSN RADIO SVCS | 1 | MARKETING ROLLUP | 6 | SERVICES | 6D |
| 453 | MCC Code | 20 | 1996-03-29 | | 5094 PRECIOUS STONES AND METALS WATCHES AND JEWELRY | 1 | MARKETING ROLLUP | 4 | RETAIL | 4Z |
| 454 | MCC Code | 20 | 1996-03-29 | | 5099 DURABLE GOODS NOT ELSEWHERE CLASSIFIED | 1 | MARKETING ROLLUP | 4 | RETAIL | 4Z |
| 456 | MCC Code | 20 | 2006-10-16 | | 5122 DRUGS DRUG PROPRIETARIES AND DRUGGIST'S SUPPLIES | 1 | MARKETING ROLLUP | 4 | RETAIL | 4E |
| 467 | MCC Code | 20 | 2006-10-16 | | 5211 BUILDING MATERIALS LUMBER STORES | 1 | MARKETING ROLLUP | 4 | RETAIL | 4D |
| 480 | MCC Code | 20 | 1995-09-18 | | 5441 CANDY NUT CONFECTIONERY STORES | 1 | MARKETING ROLLUP | 4 | RETAIL | 4H |
| 486 | MCC Code | 20 | 1995-09-18 | | 5531 AUTO STORE HOME SUPPLY STORES | 1 | MARKETING ROLLUP | 4 | RETAIL | 4I |
| 1000 | MCC Code | 20 | 2004-10-01 | 2013-10-15 | 6529 REMOTE STORED VALUE LOAD – MEMBER | 1 | MARKETING ROLLUP | 8 | CASH | 8B |
| 1001 | MCC Code | 20 | 2004-10-01 | 2013-10-15 | 6530 REMOTE STORED VALUE LOAD – MERCHANT | 1 | MARKETING ROLLUP | 8 | CASH | 8B |
| 1105 | MCC Code | 20 | 2004-10-01 | 2013-10-15 | 6534 MONEY TRANSFER-MEMBER | 1 | MARKETING ROLLUP | 8 | CASH | 8B |
| 1754 | MCC Code | 20 | 2006-04-18 | | 0004 AIR CARRIERS AIRLINES-NOT ELSEWHERE CLASSIFIED | 1 | MARKETING ROLLUP | 2 | T+E | 2A |
| 1756 | MCC Code | 20 | 2006-04-18 | | 0006 UTLS-ELCTRC GAS HEATING OIL SANITARY WATER | 1 | MARKETING ROLLUP | 6 | SERVICES | 6D |
| 1757 | MCC Code | 20 | 2006-04-18 | | 0007 COMPUTERS COMPUTER PERIPHERAL EQUIPMENT SOFTWARE | 1 | MARKETING ROLLUP | 6 | SERVICES | 6E |
| 1779 | MCC Code | 20 | 2006-04-18 | | 0029 GAME TOY AND HOBBY SHOPS | 1 | MARKETING ROLLUP | 4 | RETAIL | 4L |
| 1780 | MCC Code | 20 | 2006-04-18 | | 0030 GIFT CARD NOVELTY AND SOUVENIR SHOPS | 1 | MARKETING ROLLUP | 4 | RETAIL | 4Z |
| 1782 | MCC Code | 20 | 2006-04-18 | | 0032 FUEL DEALERS-COAL FUEL OIL LIQ PETROLEUM WOOD | 1 | MARKETING ROLLUP | 6 | SERVICES | 6D |
| 1787 | MCC Code | 20 | 2006-04-18 | | 0037 EQUIPMENT RENTAL+LEASING SVS FURNITURE-TOOL RENTAL | 1 | MARKETING ROLLUP | 6 | SERVICES | 6Z |

| HADOOP_TABLE | HDP_FIELD | ROW_CNTR | HADOOP_KEY | HDP_VALUE | HDP_CNTR | NTZ_KEY | NTZ_VALUE | NTZ_CNTR |
|---|---|---|---|---|---|---|---|---|
| core.MERCHANT_CATEGORY_HIERARCHY | CLASSIFICATION_NAME | 1 | TOTAL=1360 | | | | | |
| core.MERCHANT_CATEGORY_HIERARCHY | CLASSIFICATION_NAME | 2 | 1754 | AIRLINE~% | 1 | 1754 | AIRLINE | 1 |
| core.MERCHANT_CATEGORY_HIERARCHY | CLASSIFICATION_NAME | 3 | 1756 | UTILITIES&~% | 1 | 1756 | UTILITIES | 1 |
| core.MERCHANT_CATEGORY_HIERARCHY | CLASSIFICATION_NAME | 3 | 1757 | PROFESSIONAL SERVICES~%& | 1 | 1757 | PROFESSIONAL SERVICES | 1 |
| *** | | | | | | | | |
| core.MERCHANT_CATEGORY_HIERARCHY | BEGIN_DATE | 1 | TOTAL=1360 | | | | | |
| core.MERCHANT_CATEGORY_HIERARCHY | BEGIN_DATE | 2 | 1000 | 2004-10-01 00:00:00 | 1 | 1000 | 2004-10-01 | 1 |
| core.MERCHANT_CATEGORY_HIERARCHY | BEGIN_DATE | 3 | 1001 | 2004-10-01 00:00:00 | 1 | 1001 | 2004-10-01 | 1 |
| core.MERCHANT_CATEGORY_HIERARCHY | BEGIN_DATE | 4 | 1002 | 2000-09-01 00:00:00 | 1 | 1002 | 2000-09-01 | 1 |
| core.MERCHANT_CATEGORY_HIERARCHY | BEGIN_DATE | 5 | 10039 | 2008-08-11 13:04:08 | 1 | 10039 | 2008-08-11 | 1 |
| core.MERCHANT_CATEGORY_HIERARCHY | BEGIN_DATE | 6 | 1003 | 2007-07-02 04:05:31 | 1 | 1003 | 2007-07-02 | 1 |
| core.MERCHANT_CATEGORY_HIERARCHY | BEGIN_DATE | 7 | 10040 | 2008-08-11 13:04:08 | 1 | 10040 | 2008-08-11 | 1 |
| core.MERCHANT_CATEGORY_HIERARCHY | BEGIN_DATE | 8 | 10041 | 2008-08-11 13:04:08 | 1 | 10041 | 2008-08-11 | 1 |
| core.MERCHANT_CATEGORY_HIERARCHY | BEGIN_DATE | 9 | 10042 | 2008-08-11 13:04:08 | 1 | 10042 | 2008-08-11 | 1 |
| core.MERCHANT_CATEGORY_HIERARCHY | BEGIN_DATE | 10 | 10043 | 2008-08-11 13:04:08 | 1 | 10043 | 2008-08-11 | 1 |

{ From FIG. 7

700

| HADOOP_TABLE | HDP_FIELD | ROW_CNTR | HADOOP_KEY | HDP_VALUE | HDP_CNTR | NTZ_KEY | NTZ_VALUE | NTZ_CNTR |
|---|---|---|---|---|---|---|---|---|
| *** | | | | | | | | |
| core.MERCHANT_CATEGORY_HIERARCHY | END_DATE | 1 | TOTAL=3 | | | | | |
| core.MERCHANT_CATEGORY_HIERARCHY | END_DATE | 2 | 1000 | 2013-10-15 12:57:59 | | 1000 | 2013-10-15 | 1 |
| core.MERCHANT_CATEGORY_HIERARCHY | END_DATE | 3 | 1001 | 2013-10-15 12:57:59 | | 1001 | 2013-10-15 | 1 |
| core.MERCHANT_CATEGORY_HIERARCHY | END_DATE | 4 | 1105 | 2013-10-15 12:57:59 | | 1105 | 2013-10-15 | 1 |
| *** | | | | | | | | |
| core.MERCHANT_CATEGORY_HIERARCHY | UPDATE_DATE | 1 | TOTAL=1360 | | | | | |
| core.MERCHANT_CATEGORY_HIERARCHY | UPDATE_DATE | 2 | 1000 | 2004-10-01 00:00:00 | 1 | 1000 | 2004-10-01 | 1 |
| core.MERCHANT_CATEGORY_HIERARCHY | UPDATE_DATE | 3 | 1001 | 2004-10-01 00:00:00 | 1 | 1001 | 2004-10-01 | 1 |
| core.MERCHANT_CATEGORY_HIERARCHY | UPDATE_DATE | 4 | 1002 | 2000-09-01 00:00:00 | 1 | 1002 | 2000-09-01 | 1 |
| core.MERCHANT_CATEGORY_HIERARCHY | UPDATE_DATE | 5 | 10039 | 2008-08-11 13:04:08 | 1 | 10039 | 2008-08-11 | 1 |
| core.MERCHANT_CATEGORY_HIERARCHY | UPDATE_DATE | 6 | 1003 | 2007-07-02 04:05:31 | 1 | 1003 | 2007-07-02 | 1 |
| core.MERCHANT_CATEGORY_HIERARCHY | UPDATE_DATE | 7 | 10040 | 2008-08-11 13:04:08 | 1 | 10040 | 2008-08-11 | 1 |
| core.MERCHANT_CATEGORY_HIERARCHY | UPDATE_DATE | 8 | 10041 | 2008-08-11 13:04:08 | 1 | 10041 | 2008-08-11 | 1 |
| core.MERCHANT_CATEGORY_HIERARCHY | UPDATE_DATE | 9 | 10042 | 2008-08-11 13:04:08 | 1 | 10042 | 2008-08-11 | 1 |
| core.MERCHANT_CATEGORY_HIERARCHY | UPDATE_DATE | 10 | 10043 | 2008-08-11 13:04:08 | 1 | 10043 | 2008-08-11 | 1 |

FIG. 7 (cont.)

| ORACLE_TABLE | ORACLE_FIELD | | ROW_CNTR | ORA_KEY | ORA_VALUE | ORA_CNTR | NTZ_KEY |
|---|---|---|---|---|---|---|---|
| core.MERCHANT_CATEGORY_HIERARCHY | MERCHANT_CATEGORY_HIER_NAME | | | TOTAL=26 | | | |
| core.MERCHANT_CATEGORY_HIERARCHY | MERCHANT_CATEGORY_HIER_NAME | | 1 | 41 | 2791 TYPESETTING PLATE MAKING + | 1 | 41 |
| core.MERCHANT_CATEGORY_HIERARCHY | MERCHANT_CATEGORY_HIER_NAME | | 2 | 422 | 4214 FREIGHT CARRIER TRUCKING-LC | 1 | 422 |
| core.MERCHANT_CATEGORY_HIERARCHY | MERCHANT_CATEGORY_HIER_NAME | | 3 | 424 | 4225 PUBLIC WAREHOUSING-FARM RE | 1 | 424 |
| core.MERCHANT_CATEGORY_HIERARCHY | MERCHANT_CATEGORY_HIER_NAME | | 4 | 439 | 4899 CABLE SATELLITE OTHER PAY | 1 | 439 |
| core.MERCHANT_CATEGORY_HIERARCHY | MERCHANT_CATEGORY_HIER_NAME | | 5 | 453 | 5094 PRECIOUS STONES AND METALS | 1 | 453 |
| core.MERCHANT_CATEGORY_HIERARCHY | MERCHANT_CATEGORY_HIER_NAME | | 6 | 454 | 5099 DURABLE GOODS NOT ELSEWHER | 1 | 454 |
| core.MERCHANT_CATEGORY_HIERARCHY | MERCHANT_CATEGORY_HIER_NAME | | 7 | 456 | 5122 DRUGS DRUP PROPRIETARIES | 1 | 456 |
| core.MERCHANT_CATEGORY_HIERARCHY | MERCHANT_CATEGORY_HIER_NAME | | 8 | 467 | 5211 BUILDING MATERIALS LUMBER | 1 | 467 |
| core.MERCHANT_CATEGORY_HIERARCHY | MERCHANT_CATEGORY_HIER_NAME | | 9 | 480 | 5441 CANDY NUT CONFECTIONERY S | 1 | 480 |
| core.MERCHANT_CATEGORY_HIERARCHY | MERCHANT_CATEGORY_HIER_NAME | | 10 | 486 | 5531 AUTO STORE HOME SUPPLY STO | 1 | 486 |
| ## | | | 11 | | | | |
| core.MERCHANT_CATEGORY_HIERARCHY | MERCHANT_CATEGORY_NAME | | 1 | TOTAL=23 | | | |
| core.MERCHANT_CATEGORY_HIERARCHY | MERCHANT_CATEGORY_NAME | | 2 | 1000 | REMOTE STORED VAL | 1 | 1000 |
| core.MERCHANT_CATEGORY_HIERARCHY | MERCHANT_CATEGORY_NAME | | 3 | 1001 | REMOTE STORED VAL | 1 | 1001 |
| core.MERCHANT_CATEGORY_HIERARCHY | MERCHANT_CATEGORY_NAME | | 4 | 1105 | MONEY TRANSFER-ME | 1 | 1105 |
| core.MERCHANT_CATEGORY_HIERARCHY | MERCHANT_CATEGORY_NAME | | 5 | 1754 | AIR CARRIERS AIR | 1 | 1754 |
| core.MERCHANT_CATEGORY_HIERARCHY | MERCHANT_CATEGORY_NAME | | 6 | 1756 | UTLTS-ELCTRC GAS | 1 | 1756 |
| core.MERCHANT_CATEGORY_HIERARCHY | MERCHANT_CATEGORY_NAME | | 7 | 1757 | COMPUTERS COMPUT | 1 | 1757 |
| core.MERCHANT_CATEGORY_HIERARCHY | MERCHANT_CATEGORY_NAME | | 8 | 1779 | GAME TOY AND HO | 1 | 1779 |
| core.MERCHANT_CATEGORY_HIERARCHY | MERCHANT_CATEGORY_NAME | | 9 | 1780 | GIFT CARD NOVEL | 1 | 1780 |
| core.MERCHANT_CATEGORY_HIERARCHY | MERCHANT_CATEGORY_NAME | | 10 | 1782 | FUEL DEALERS-COAL | 1 | 1782 |
| core.MERCHANT_CATEGORY_HIERARCHY | MERCHANT_CATEGORY_NAME | | 11 | 1787 | EQUIPMENT RENTAL+ | 1 | 1787 |

| NTZ_VALUE | NTZ_CNTR |
|---|---|
| 2791 TYPESETTING PLATE MAKING + RELATED SERVICES | 1 |
| 4214 FREIGHT CARRIER TRUCKING-LCL-LNG DIST MVG-STORAGE | 1 |
| 4225 PUBLIC WAREHOUSING-FARM REFRIG GOODS HHG STORAGE | 1 |
| 4899 CABLE SATELLITE OTHER PAY TELEVISION RADIO SVCS | 1 |
| 5094 PRECIOUS STONES AND METALS WATCHES AND JEWELRY | 1 |
| 5099 DURABLE GOODS NOT ELSEWHERE CLASSIFIED | 1 |
| 5122 DRUGS DRUP PROPRIETARIES AND DRUGGIST'S SUPPLIES | 1 |
| 5211 BUILDING MATERIALS LUMBER STORES | 1 |
| 5441 CANDY NUT CONFECTIONERY STORES | 1 |
| 5531 AUTO STORE HOME SUPPLY STORES | 1 |
| | |
| REMOTE STORED VALUE LOAD – MEMBER | 1 |
| REMOTE STORED VALUE LOAD – MERCHANT | 1 |
| MONEY TRANSFER-MEMBER | 1 |
| AIR CARRIERS AIRLINES-NOT ELSEWHERE CLASSIFIED | 1 |
| UTLTS-ELCTRC GAS HEATING OIL SANITARY WATER | 1 |
| COMPUTERS COMPUTER PERIPHERAL EQUIPMENT SOFTWARE | 1 |
| GAME TOY AND HOBBY SHOPS | 1 |
| GIFT CARD NOVELTY AND SOUVENIR SHOPS | 1 |
| FUEL DEALERS-COAL FUEL OIL LIQ PETROLEUM WOOD | 1 |
| EQUIPMENT RENTAL+LEASING SVS FURNITURE-TOOL RENTAL | 1 |

From FIG. 8

| NDB | NETEZZA TABLE | NTZ_FIELD | NTYPE | NT2 | FILLER | HDB | HADOOP TABLE | HFIELD | HTYPE | HT2 |
|---|---|---|---|---|---|---|---|---|---|---|
| core | MERCHANT_CATEGORY_HIERARCHY | BEGIN_DATE | TIMESTAMP | TS | *** | core | MERCHANT_CATEGORY_HIERARCHY | BEGIN_DATE | STRING | T |
| core | MERCHANT_CATEGORY_HIERARCHY | END_DATE | TIMESTAMP | TS | *** | core | MERCHANT_CATEGORY_HIERARCHY | END_DATE | STRING | T |
| core | MERCHANT_CATEGORY_HIERARCHY | UPDATE_DATE | TIMESTAMP | TS | *** | core | MERCHANT_CATEGORY_HIERARCHY | UPDATE_DATE | STRING | T |

FIG. 10 — 1000

| NDB | NETEZZA TABLE | NTZ_FIELD | NTYPE | NT2 | FILLER | ODB | ORACLE TABLE | OFIELD | OTYPE | OT2 |
|---|---|---|---|---|---|---|---|---|---|---|
| core | MERCHANT_CATEGORY_HIERARCHY | BEGIN_DATE | TIMESTAMP | TS | *** | ora | MERCHANT_CATEGORY_HIERARCHY | BEGIN_DATE | DATE | D |
| core | MERCHANT_CATEGORY_HIERARCHY | END_DATE | TIMESTAMP | TS | *** | ora | MERCHANT_CATEGORY_HIERARCHY | END_DATE | DATE | D |
| core | MERCHANT_CATEGORY_HIERARCHY | UPDATE_DATE | TIMESTAMP | TS | *** | ora | MERCHANT_CATEGORY_HIERARCHY | UPDATE_DATE | DATE | D | ent
SYSTEMS AND METHODS FOR VALIDATING DATABASE INTEGRITY

FIELD

The present disclosure generally relates to systems and methods for validating database integrity and, in particular, to systems and methods for validating data included in multiple disparate databases, through identifying data in the multiple disparate database based on key name values and/or counts associated with the data in the databases and comparing the identified data.

BACKGROUND

This section provides background information related to the present disclosure which is not necessarily prior art.

Data is known to be stored in databases in various different implementations. In one implementation, transaction data is stored in one or more databases on a payment network. The transaction data is indicative of payment account transactions, in which consumers purchase products (e.g., goods and/or services, etc.) from merchants through use of payment accounts, exchange funds with other consumers, etc. Typically, the transaction data is collected and stored into the databases, which, in turn, may include thousands, hundreds of thousands, or millions of transaction records, each including various details about the associated transaction. What's more, depending on the use of the transaction data, the transaction data may be loaded into various different databases, and may also be copied or duplicated across the different databases. The different databases, in turn, may be used by different tools, programs, etc. to access and/or analyze the transaction records therein, whereby the different databases are suited to the different tools, programs, etc.

DRAWINGS

The drawings described herein are for illustrative purposes only of selected embodiments and not all possible implementations, and are not intended to limit the scope of the present disclosure.

FIG. 1 illustrates an exemplary system of the present disclosure suitable for use in validating data included in multiple disparate databases;

FIG. 2 includes an exemplary data structure of an Oracle® database of FIG. 1, and which includes merchant category transaction data;

FIG. 3 includes an exemplary data structure of a Hadoop® database of FIG. 1, and which includes merchant category transaction data;

FIG. 4 includes an exemplary data structure of a Netezza® database of FIG. 1, and which includes merchant category transaction data;

FIGS. 7-10 include exemplary notifications and/or reports, which may be generated by the exemplary system of FIG. 1 and/or pursuant to the exemplary method of FIG. 6.

Corresponding reference numerals indicate corresponding parts throughout the several views of the drawings.

DETAILED DESCRIPTION

Figure 1:
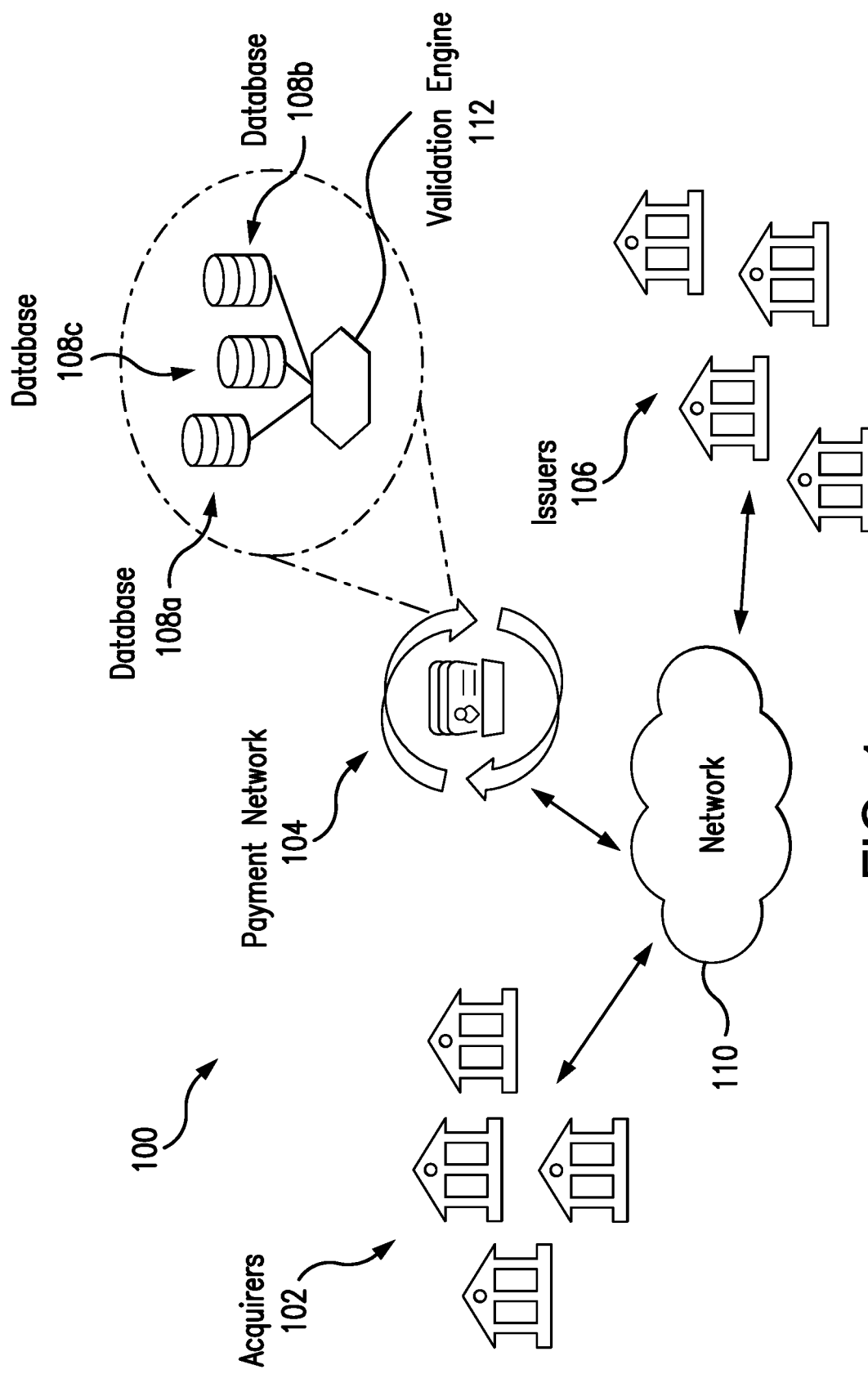

Exemplary embodiments will now be described more fully with reference to the accompanying drawings. The description and specific examples included herein are intended for purposes of illustration only and are not intended to limit the scope of the present disclosure.

Databases include data in one or more different data structures. In particular, transaction data is generated, compiled, and stored within payment networks for various purposes. In general, the transaction data is stored in databases, such as, for example, in tables, which include hundreds, thousands, or millions of records, with each of the records including multiple fields of data and associated with one or more transactions. As the data is loaded to multiple databases, the potential for inconsistencies among the databases exists in the sources of the data and load process for the databases. This impacts database integrity. For example, different extract, transform, and load scripts for the disparate databases may run at different times across the disparate databases and different ISO (International Organization for Standardization) standards may apply to different databases (depending, for example, on whether a database is Oracle-, Linux-, or Unix-based, etc.), bringing about the potential for inconsistences among the databases, in combination with the potential for human error, and in the timing of the data loads. The inconsistencies or errors may limit and/or alter analysis performed on the data in the databases. Validation of the data across the disparate databases is relied upon to avoid such inconsistencies, but is difficult given the disparate databases.

For example, according to a prior potential technique for validating data across disparate databases (prior to the instant disclosure), one or more users may manually identify the disparate databases that are generally assumed to contain the same data and manually traverse each set of fields (e.g., over 100,000 fields, etc.) in each data structure under validation in each disparate database (e.g., three different types of databases, etc.), manually determine which records (e.g., rows, etc.) in each data structure correspond to one another, manually compare each field value in each row of each data structure in the disparate databases to the corresponding field value in the corresponding row of the corresponding data structure in the other disparate databases, and manually note any inconsistencies in data and/or formatting/layout on a case-by-case basis (e.g., the fact of an inconsistency; the database type; the specific data structure, record, field name, etc.; where the inconsistency exists; and/or the values of the inconsistent data; etc.). And then, once the validation of all of the data is complete (which may take days, months, or even years depending on the amount of data), reports on the inconsistencies manually identified by one or more users may be manually compiled (potentially, after re-entering the data structures to gather more details about the inconsistencies, such that the inconsistencies can be reported in an identifiable and understandable form in order to allow a user to take corrective action). Of course, validation of large amounts of data may not even be possible or realistic with this technique, given the time and/or labor that may be required, exposing the disparate databases to potential issues with poor data integrity.

Uniquely, the systems and methods herein provide for validation of data in disparate databases, based on identifying data in one database to data in another database according to validation commands, comparing the identified data, and generating reports, which indicate differences of the compared data, without requiring manual validation by a user apart from potentially specifying a validation command or script with validation command parameters. The indicated differences may include differences in value or in format/layout. Validation commands may be tailored, by users, to be specific to the data to be validated, in the specific databases, whereby the data is validated with any differences (e.g., based on load errors, program bugs, incorrect sources, etc.) detected and reported to the users, thereby permitting corrective action to be taken.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, types of data, manners of gathering and loading of data, types and number of databases, etc.

The illustrated system 100 generally includes multiple acquirers 102, a payment network 104 (including multiple databases 108a-c, as indicated by the dotted lines), and multiple issuers 106, each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 104 to the acquirers 102 and the issuers 106 and, separately, the public Internet, which may provide interconnection between the acquirers 102 (as appropriate) and merchants (not shown), etc.

The acquirers 102 are associated with different merchants, or more generally, entities, which participate in payment account transactions. The acquirers 102 are provided payment account information, and are then employed in the payment account transactions to receive and/or provide funding for the transactions involving the merchants. The merchants, in turn, generally offer for sale and sell products (e.g., goods and services, etc.) to consumers. The products are generally in one or more categories, whereby the merchants are often associated with merchant category codes or MCCs, which are indicative of the types of categories of the merchants. Exemplary MCCs include 4899 for cable, satellite, and other pay television radio services and 5211 for building materials lumber stores, etc.

The issuers 106 issue accounts to entities or consumers, such as credit accounts, debit accounts, bank accounts, etc. The accounts are then used, in turn, by the consumers to fund payment account transaction at the merchants.

The payment account transactions are facilitated through the payment network 104. In a typical transaction, an authorization is requested by a merchant, through one of the acquirers 102, through the payment network 104 to one of the issuers 106. When the issuer 106 responds with an approval, the approval is passed back through the payment network 104 and the acquirer 102 to the merchant. The transaction and other transactions, when approved, are then later cleared and settled among the acquirers 102 and the issuers 106 (i.e., whereby funds are exchanged), through the payment network 104. In connection therewith, transaction data is generated, collected, and stored as part of the above interactions among the acquirers 102 (and associated merchants/entities), the payment network 104, the issuers 106 (and associated consumers/entities), etc. In general, the transaction data is representative of hundreds thousands, millions, etc., of transactions.

The transaction data is loaded and/or organized into one or more different data structures. The data structure may include, for example, tables, which include each individual transaction or an aggregation(s) of the transactions (e.g., where one record represents an aggregation of multiple transactions, etc.). The data structures are then loaded, replicated or stored to one or more of the database 108a-c in the payment network 104 in this exemplary system embodiment.

In particular, the databases 108a-c include disparate databases (e.g., different, dissimilar, etc. databases). Specifically, in the exemplary embodiment of FIG. 1, the database 108a includes a database based on an Oracle® platform (e.g., as indicated at https://www.oracle.com/index.html); the database 108b includes a Hadoop® distributed file system (e.g., as indicated at http://hadoop.apache.org/); and the database 108c includes a database based on the Netezza® platform (by IBM Corporation) (e.g., as indicated at https://www-01.ibm.com/software/data/netezza/). It should be appreciated that while the databases 108a-c are each illustrated as a single device and/or entity in FIG. 1, each one or multiple ones of the databases 108a-c may include multiple different devices (e.g., computing devices, etc.), which, in turn, may then form the particular one or more of the databases 108a-c, in one location or as a distributed database. Further, it should be appreciated that the system 100 may include a different number of databases (e.g., two databases, four databases, more than four databases, etc.), each associated with one or the forms above (i.e., Oracle®, Hadoop®, Netezza®), or a different form.

Each of the databases 108a-c includes multiple data structures, each of which includes transaction data generated as described above, collected in connection with the system 100, and stored therein. The data structures included in the databases 108a-c are created, compiled and/or stored for one or more purposes, which may implicate which of the database 108a-c is to be used for the particular purpose depending, for example, on a desired output or querying. Each database type provides unique advantages over one or more of the other database types in these respects. For instance, Hadoop® databases are suitable for querying large amounts of data, Netezza® databases are suitable for more complex data queries, and Oracle® database are suitable for simple data reporting. That said, the databases 108a-c, in this embodiment, or in other embodiments, may be segregated, separated and/or differentiated into one or more different computing devices, for reasons of purpose, usability, legacy structure, migration scheme, and/or operation specific to the databases 108a-c (or data structures therein), etc.

Figure 2:
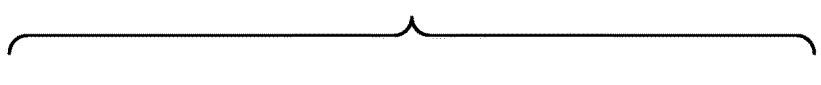
Figure 4:
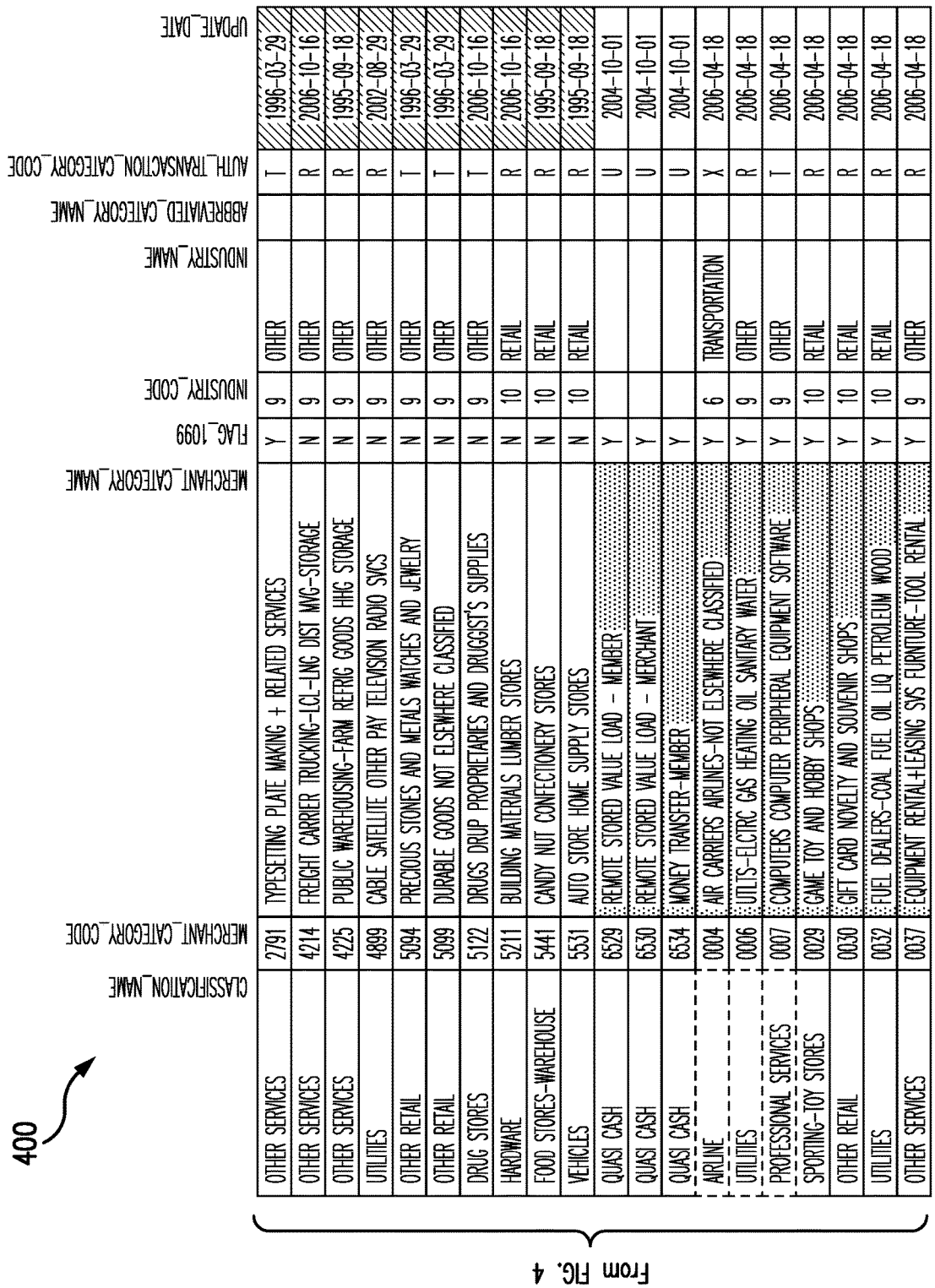

As for the data structures, the transaction data may be included in data structures, where each transaction is represented in one record of the data structure, where the details of the transaction are included in the record. Additionally, or alternatively, the transaction data may be aggregated, where a record in a data structure represents multiple transactions, where the aggregate details of the transactions are included in the record. In FIGS. 2-4, transaction data is aggregated in data structures 200, 300 and 400 of the databases 108a-c, respectively.

Specifically, FIGS. 2-4 illustrate three different data structures 200, 300 and 400, each of which includes aggregate data related to merchant category for multiple transactions. Specifically, FIG. 2 includes a data structure 200 included in the Oracle® database 108a; FIG. 3 includes a data structure 300 included in the Hadoop® database 108b; and FIG. 4 includes a data structure 400 included in the Netezza® database 108c. As shown, each of the data structures includes multiple records, each record representing an aggregation of multiple transactions, where each record is represented by a row having a units identifier (i.e., MERCHANT_CATEGORY_HIERARCHY_ID) and includes multiple fields. The fields are labeled with field names, such as, for example, LEVEL_NAME, LEVEL_NUMBER, BEGIN_DATE, MERCHANT_CATEGORY_HIER_NAME, etc. It should be appreciated that the data included in the data structure 200, 300 and 400 is generally the same and consistent. Differences in the data structures 200, 300, and 400 may be attributed, for example, to a manner in which the data was loaded (e.g., a data loader, etc.) and errors in the loading processes. For instance, different extract, transform, and load scripts for the disparate databases 108a-c may run at different times across the disparate databases 108a-c and different ISO (International Organization for Standardization) standards may apply to the different databases 108a-c (depending, for example, on whether one of the databases 108a-c is Oracle-, Linux-, or Unix-based), bringing about the potential for inconsistences among the databases 108a-c (and data structures 200, 300, and 400 therein), in combination with the potential for human error and timing of the data loads.

It should be appreciated that while the data included in FIGS. 2-4 is specific to merchant categories, and more generally, transaction data, it is provided only for purposes of illustration and should not be understood to limit the scope of the present disclosure.

What's more, it should be appreciated that while multiple acquirers 102, one payment network 104, and multiple issuers 106 are included in the system 100, other system embodiments may include a different number of such entity, along with additional or different entities, where each is associated with transaction data. In addition, the payment network 104 may include a different number of the databases 108a-c in other system embodiments. Moreover, while the description herein is presented with reference to transaction data, the present disclosure may be employed with other types of data (and thus other types of entities), which are stored in disparate data structures, of substantial size, and/or that includes replicated data among multiple different databases, etc.

Figure 5:
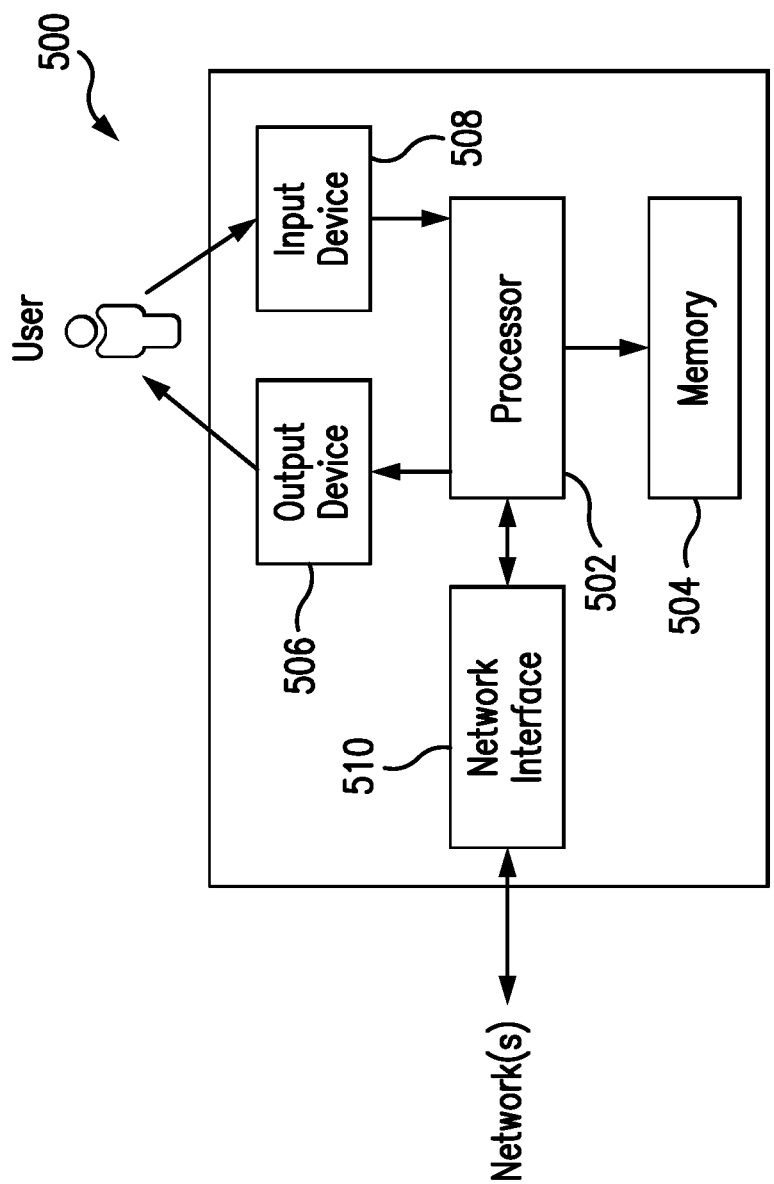
FIG. 5 is a block diagram of a computing device that may be used in the exemplary system of FIG. 1.

FIG. 5 illustrates an exemplary computing device 500 that can be used in the system 100. The computing device 500 may include, for example, one or more servers, workstations, personal computers, laptops, tablets, smartphones, PDAs, POS devices, etc. In addition, the computing device 500 may include a single computing device, or it may include multiple computing devices located in close proximity or distributed over a geographic region, so long as the computing devices are specifically configured to function as described herein. In the exemplary system 100 of FIG. 1, each of the acquirers 102, the payment network 104, the issuers 106, databases 108a-c, and validation engine 112 include and/or are implemented in a computing device similar to the computing device 500. However, the system 100 should not be considered to be limited to the computing device 500, as described below, as different computing devices and/or arrangements of computing devices may be used. In addition, different components and/or arrangements of components may be used in other computing devices.

Referring to FIG. 5, the exemplary computing device 500 includes a processor 502 and a memory 504 coupled to (and in communication with) the processor 502. The processor 502 may include one or more processing units (e.g., in a multi-core configuration, etc.). For example, the processor 502 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 504, as described herein, is one or more devices that permit data, instructions, etc., to be stored therein and retrieved therefrom. The memory 504 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. In addition, the memory 504 may include a memory architecture, not only as a physical device, but also an arrangement of physical devices located together or spread across a geographic region. With that said, the memory 504 may be configured, as one or more data structures, to store, without limitation, transaction data, notifications, reports, and/or other types of data (and/or data structures) suitable for use as described herein. Furthermore, in various embodiments, computer-executable instructions may be stored in the memory 504 for execution by the processor 502 to cause the processor 502 to perform one or more of the operations described herein, such that the memory 504 is a physical, tangible, and non-transitory computer-readable storage media. Such instructions often improve the efficiencies and/or performance of the processor 502 that is performing one or more of the various operations herein. It should be appreciated that the memory 504 may include a variety of different memories, each implemented in one or more of the functions or processes described herein.

In the exemplary embodiment, the computing device 500 includes an output device 506 that is coupled to (and is in communication with) the processor 502. The output device 506 outputs information (e.g., differences among data structure or databases (e.g., by field names, values and formats, etc.), etc.), visually, or audibly, for example, to a user of the computing device 500. It should be further appreciated that various interfaces (e.g., as defined by notifications, prompts associated with a validation engine 112, etc.) may be displayed at computing device 500, and in particular at output device 506, to display certain information. The output device 506 may include, without limitation, a liquid crystal display (LCD), a light-emitting diode (LED) display, an organic LED (OLED) display, an "electronic ink" display, speakers, etc. In some embodiments, the output device 506 may include multiple devices.

The computing device 500 also includes an input device 508 that receives inputs from the user (i.e., user inputs) such as, for example, validation commands, etc. The input device 508 is coupled to (and is in communication with) the processor 502 and may include, for example, a keyboard, a pointing device, a mouse, a touch sensitive panel (e.g., a touch pad or a touch screen, etc.), another computing device, etc. Further, in various exemplary embodiments, a touch screen, such as that included in a tablet, a smartphone, or similar device, may behave as both the output device 506 and the input device 508.

In addition, the illustrated computing device 500 also includes a network interface 510 coupled to (and in communication with) the processor 502 and the memory 504. The network interface 510 may include, without limitation, a wired network adapter, a wireless network adapter, a mobile network adapter, or other device capable of communicating to one or more different networks, including the network 110. Further, in some exemplary embodiments, the computing device 500 may include the processor 502 and one or more network interfaces incorporated into or with the processor 502.

Referring again to FIG. 1, the system 100 includes a validation engine 112 specifically configured, by executable instructions, to operate as described herein. The validation engine 112 is coupled to and is in communication with each of the databases 108a-c, as shown. In addition, the validation engine 112 is illustrated as a standalone part of the payment network 104 and, in this manner, may be considered a computing device consistent with computing device 500. Additionally, or alternatively, the validation engine 112 may be integrated, in whole or in part, with the payment network 104 in various embodiments. Further still, the validation engine 112 may be integrated, in whole or in part, with one or more of the databases 108a-c in other system embodiments.

The validation engine 112 is configured to initiate a review of the data included in one or more data structures within one or more of the databases 108a-c (broadly, the one or more databases under validation) in connection with the data in one or more data structures within another one of the databases 108a-c (broadly, the "driver" database). In particular, at a scheduled time, according to a command or script, or in response to another user input, the validation engine 112 is configured to receive a validation command (including one or more validation command parameters), to access one or more data structures, or parts thereof (e.g., a field(s), etc.), in multiple of the databases 108a-c (consistent with the validation command and one or more parameters specified therein), and to identify data in one or more data structures of the driver database 108a-c to data in one or more data structures in another one or more of the databases 108a-c under validation, for example, based on a key name value, specified as part of the validation command parameters, a date and/or count included in the data therein, etc., such that, for example, a first data record in the driver database 108a-c is identified to a second data record in the one or more databases 108a-c under validation when the key name value, date, and/or count of a first data record in the driver database matches the key name value, data, and/or count of the second data record in the one or more databases 108a-c under validation.

In this manner, based on the validation command parameters, the validation engine 112 is configured to automatically associate data (e.g., each of multiple data records or rows, etc.) in one or more data structures of each of the one or more databases 108a-c under validation with the corresponding data (e.g., each of the corresponding multiple data records or rows, etc.) in the one or more data structures of the given driver database 108a-c, wherein the associated data (e.g., each associated row or record) is generally assumed to be the same, apart from any potential inconsistences (e.g., caused based on the circumstances explained above, etc.). The validation engine 112 is configured to identify potential inconsistences. In particular, once identified, the validation engine 112 is configured to compare the identified/associated data. The comparison may include a comparison of the value included in a data structure and/or field of the driver database (broadly, first data) with the value included in a corresponding data structure and/or field of the database under validation (broadly, second data) and/or a comparison of the format or layout of the data structure and/or field of the driver database (broadly, the format or layout of first data) with format or layout of the data structure and/or field of the database under validation (broadly, the format or layout of second data).

Thereafter, the validation engine 112 is configured to generate a report, in which any differences between the accessed data structures of the databases 108a-c are included (e.g., identified, flagged, etc.). The differences may be included in the report, by field name, value, format, etc., whereby users viewing the report are permitted to investigate an origin of the differences and take corrective action.

Figure 6:
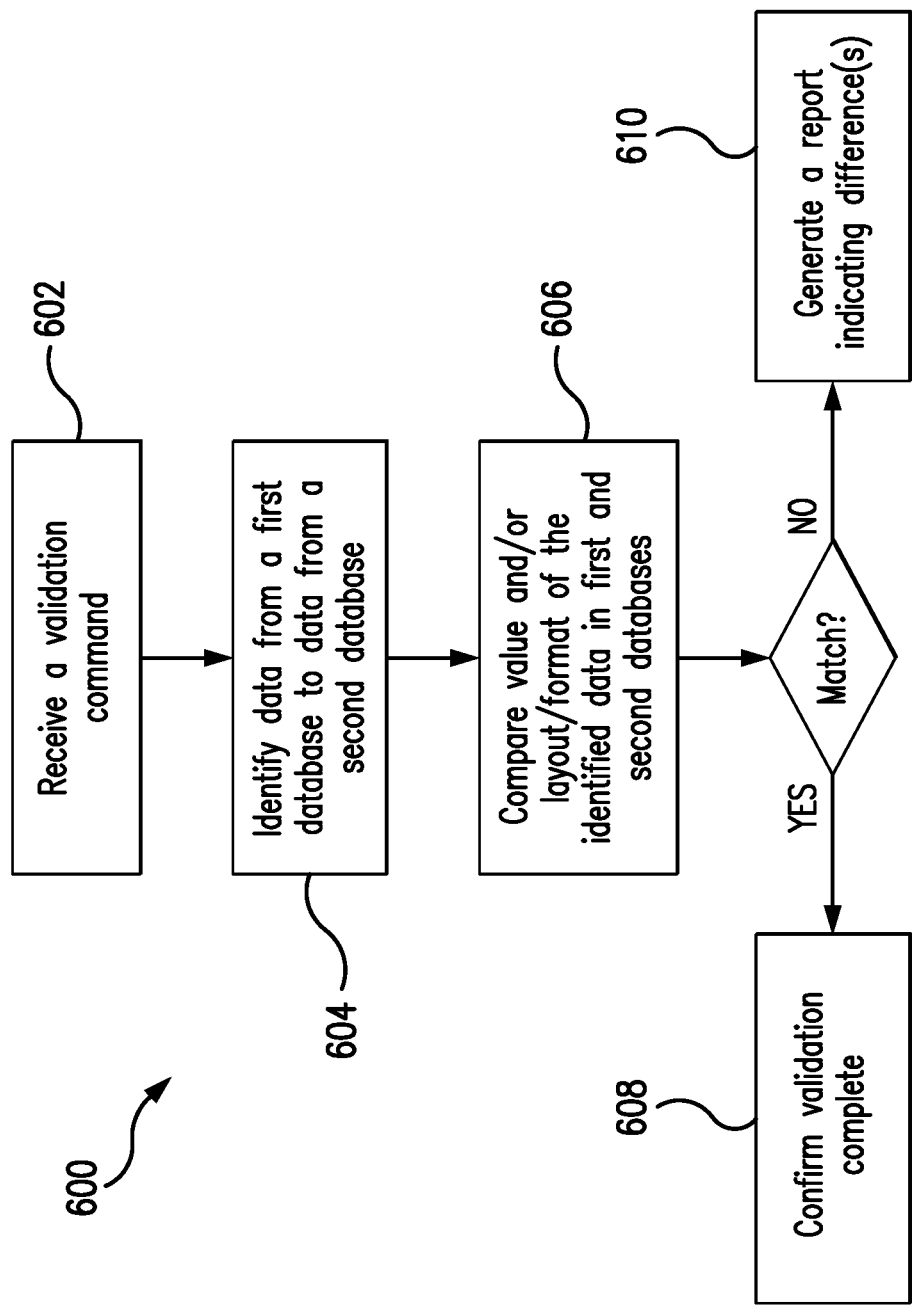
FIG. 6 is an exemplary method that may be implemented in connection with the system of FIG. 1 for use in validating data included in multiple disparate databases.

FIG. 6 illustrates an exemplary method 600 for validating data included in multiple disparate databases. The exemplary method 600 is described as implemented in the validation engine 112 of the system 100, with additional reference to the databases 108-c, etc. However, the method 600 is not limited to the validation engine 112 or the databases 108-c, or more generally, to the system 100. Further, the exemplary method 600 may be further described with reference to the computing device 500. But the methods herein should not be understood to be limited to the exemplary computing device 500. Likewise, the systems and computing devices herein should not be understood to be limited to the exemplary method 600.

In addition, the method 600 is described, specifically, with reference to the data structures 200, 300, and 400 illustrated in FIGS. 2-4, respectively, as included in the databases 108a-c, respectively. It should be appreciated, again, that the method 600 is not limited to the specific data structures 200, 300, and 400 or databases 108a-c and may be applied to any different data structures, parts of data structures, or more generally, databases.

At the outset in method 600, validation of the data included in multiple of the data structures 200, 300 and 400 is desired and/or required. The validation of the data may be desired and/or required for a variety of reasons, including, without limitation, as a matter of maintenance, routine or otherwise, of the databases 108a-c, in response to specific changes affecting data in the databases 108a-c, etc. In one specific example, a new software or process may relate to data in one or more fields in one or more data structures. Upon implementation of the new software, a user may create and execute a script directed to the one or more fields, which runs for consecutive hours, days, etc., to affirm proper operation of the new software or process (as it pertains to the databases 108a-c).

In connection with the above, the user submits a validation command, to a command prompt, or otherwise, to the validation engine 112, and the validation engine 112 in turn receives the validation command, at 602. The validation command, in this exemplary embodiment, may include a command (e.g., an SQL command, etc.) or script, specifying parameters for the validation, etc. The command or script may specify, among other things, as parameters, particular databases, data structures, and/or fields therein, and the bases for identifying data for validation across the data structures (e.g., key name, date, count, etc.), such that the bases can be used by the validation engine to identify data records in multiple databases that correspond to one another. The validation command may be a manual command or, for example, in the form of a script (e.g., an SQL injection set script, etc.). The validation command, in some embodiments or instances, may (or may not) also include a load date (also referred to herein as "a system date"), reflecting a date that the data for validation was loaded into the database, data structure, fields, etc., as a further way to limit the databases, data structures, fields, etc. for validation, such that data retrieved from the particular databases, data structures, and/or fields, etc. is limited to the specific load/system date.

Table 1 includes two exemplary sets of validation command parameters. The first set of validation command parameters is for validation of data and format/layout in data structure 300 in the Hadoop® database 108b against reference (or "driver") data and format/layout in data structure 400 in the reference/driver Netezza® database 108c, where the parameters give rise to the reports in FIG. 7 (data validation report) and FIG. 9 (format/layout validation report). The second set of validation command parameters is for validation of data and format/layout in data structure 200 in the Oracle® database 108a against reference (or "driver") data and format/layout in data structure 400 in the reference/driver Netezza® database 108c, where the parameters give rise to the reports in FIG. 8 (data validation report) and FIG. 10 (format/layout validation report). In connection therewith, the parameters may be passed to a shell of the validation engine 112, as part of the validation command, whereby the shell may then facilitate the validation in accordance with the parameters. Code for an example shell is provided in Appendix A, which is incorporated herein by reference.

The example validation command parameters in the two sets of validation command parameters in Table 1 include a_PROC parameter for each validation, the_PROC parameter specifying one or more database types for validation against a reference (or "driver") database type. The reference/driver database type is the database type that is generally assumed to contain the correct data and format/layout for the data structures, fields, etc. under validation. For example, command parameters giving rise to a validation of data and format/layout of Hadoop® database 108b against data and format/layout of reference/driver Netezza® database 108c (as reported in FIGS. 7 and 9) would, in this example, specify_PROC="NH." In each set of the example command parameters, N represents a Netezza® type, H represents a Hadoop® type, and O represents an Oracle® type.

Command parameters for a validation may also, in one or more embodiments or instances, include an_OVERWRITE parameter, specifying whether prior validation results (e.g., prior results involving the same validation command parameters, etc.) are to be overwritten with the new validation results.

The command parameters for a validation may also specify various additional criteria by which data is retrieved for validation. For example, the command parameters below include multiple_QLINEX parameters. Each_QLINEX parameter (if supplied) specifies particular data (broadly, narrows the data) to be retrieved as part of the validation. For example, for command parameters for the validation of data and format/layout of the Hadoop® database 108b against data and format/layout of driver Netezza® database 108c (as reported in FIGS. 7 and 9), _QLINE1 specifies the specific driver database from which data is to be validated against (in this example, the "core" Netezza® database). _QLINE2, then, in this example, specifies the key name ("MERCHANT_CATEGORY_HIERARCHY_ID") for the driver/reference data structure against which the data and format/layout for validation is to be compared. It should be appreciated that the corresponding key name for the data and format/layout under validation may be different for the data under validation (e.g., for the corresponding data in data structure 300 in Hadoop® database 108b, etc.). Therefore, a system mapping table may be utilized to identify the corresponding key name (here, a field name) for the data structure 300. For example, the corresponding key name in one or more other embodiments could be "MERCHANT_CATEGORY_HIERARCHY_IDENTIFIER." The mapping table, then, may associate the "MERCHANT_CATEGORY_HIERACHY_ID" key name (here, a field) for one database with the field "MERCHANT_CATEGORY_HIERACHY_IDENTIFER" in another database, such that the mapping table indicates that the key name values (here, field values) in the "MERCHANT_CATEGORY_HIERARCHY_ID" field generally correspond to the key name values (here, field values) in the "MERCHANT_CATEGORY_HIERACHY_IDENTIFIER" field.

QLINE3 through _QLINE4 parameters are not specified in this example, but in other examples may be used to further narrow the data that is to be accessed as reference data for the validation. In addition, although not provided in this example, the command parameters may further include a load or system date range (e.g., _SRNGE=YYYY-MM-DD for a start of a load/system date range and _ERNGE=YYYY-MM-DD for an end of load/system date range, etc.), specifying that only data loaded into the reference data structure within the date range is to be evaluated. In this example, it should be appreciated that the shell generally associates the different database types for validation with the appropriate hosts, whereby the validation command parameters generally need not include a database host name identification. However, validation command parameters (e.g., NZ_HOST01=nps2ksc0 and NZ_HOST02=nps2st16 for the driver database and database under validation, etc.) may be specified as command parameters (e.g., in the event the shell is not updated to associate a particular type(s) of database(s) with a particular host(s) as part of a particular validation (e.g., for a Netezza® to Netezza® comparison, etc.).

TABLE 1

| Description | Command Parameters | Report |
|---|---|---|
| Hadoop® Database 108b vs. Netezza® Database 108c, merchant category | #### N = Netezza, H = Hadoop, and O = Oracle<br>#### First _PROC identifier is the driver _PROC="NH"<br>#### OVERWRITE THE PREVIOUSLY RUN<br>#### DATA CHECKS?<br>_OVERWRITE="N"<br>#### CRITERIA FOR QUERY<br>_QLINE1="AND NTZ_DB IN ('core')"<br>_QLINE2=" AND (NTZ_TNAME = ('MERCHANT_CATEGORY_HIERARCHY_ID'))"<br>_QLINE3=""<br>_QLINE4=""<br>_QLINE5=""<br>run_checks | FIGS. 7 and 9 |
| Oracle® Database 108a vs. Netezza® Database 108c, merchant category | #### N = Netezza, H = Hadoop, and O = Oracle<br>#### First _PROC identifier is the driver _PROC="ON"<br>#### OVERWRITE THE PREVIOUSLY RUN<br>#### DATA CHECKS?<br>_OVERWRITE="N"<br>#### CRITERIA FOR QUERY<br>_QLINE1=" AND NTZ_DB IN ('core')"<br>_QLINE2=" AND (NTZ_TNAME = ('MERCHANT_CATEGORY_HIERARCHY_ID'))"<br>_QLINE3=""<br>_QLINE4=""<br>_QLINE5=""<br>run_checks | FIGS. 8 and 10 |

The validation commands from the user may be directed to data structures within the databases 108a-c individually, or in groups, or even to specific fields (or columns) within one or more data structures in the databases 108a-c. For example, one or more fields in one of the databases 108a-c (in the same or different data structures therein) may be compared to one or more fields in another one or more of the databases 108a-c. As another example, where the same data is loaded into databases on three different platforms, there may be three-way comparisons, such that one or more fields in two of three different databases to be validated are compared against one or more fields in the other of the three databases. For example, data in both the Oracle® database 108a and the Hadoop® databases 108b may be validated against reference/driver Netezza® database 108c by providing a validation command that includes a parameter of _PROC="NOH."

With continued reference to FIG. 6, each validation command is executed by the validation engine 112, whereupon the validation engine 112 identifies data from one of the data structures 200, 300, and 400 in the respective databases 108a-c to data from another of the data structures 200, 300, and 400 in the respective databases 108a-c, at 604.

In this exemplary embodiment, the validation engine 112 identifies the data based, at least in part, on the key name values, which in data structures 200, 300, and 400 of the databases 108a-c, include various values for the MERCHANT_CATEGORY_HIERARCHY_ID key name (here, a field), as shown in FIGS. 2-4, to identify the data, and in particular the data records or rows (e.g., entire, lines, etc.) of the data structures to be compared, based on the key name values. However, as discussed above, each of data structures 200, 300, and 400 represents an aggregation of multiple transactions. And, in this example, the key name value (for the key name MERCHANT_CATEGORY_HIERARCHY_ID) is specific to the merchant category type, and thus the MCC (MERCHANT_CATEGORY_CODE), each of which may apply to multiple different transactions. Therefore, although not shown in the examples in FIGS. 2-4, it is possible that the same key name values (MERCHANT_CATEGORY_HIERACHY_ID) may appear in the data structures 200, 300, and 400 multiple times (e.g., for different dates (e.g., BEGIN_DATE, etc.), etc.), such that identifying a data record for comparison based only on the key name value may not be practicable.

In any case, with reference to FIG. 2, the record of the first row includes a key name value 41, and the record of the first row of the data structures of FIG. 4 also includes a key name value 41. Along with the key name values, each record includes multiple fields, each having a field name (e.g., BEGIN_DATE, MERCHANT_CATEGORY_CODE_COUNT, MERCHANT_CATEGORY_HIER_NAME, etc.) and a value and/or format associated therewith. Next, in the identifying step of 604, to prevent records being misidentified to one another across data structures (e.g., where each data structure includes multiple instances of the same key) the validation engine 112 relies on the date value of the transaction (e.g., BEGIN_DATE, etc.), and also, potentially, on a count (or number of occurrences) of the key (MERCHANT_CATEGORY_CODE_COUNT) on the date of the records in the individual transactions which the aggregated records represent. Here, it should be appreciated that the count is 1 for each record in data structures 200, 300, and 400, because each record is a detail data record, such that each record represents a single record. However, in one or more other instances, one or more (or all) records may be summary records, such that each of the summary records represents an aggregation of other records in summary form, where the count is greater than 1 and corresponds to the number of records summarized in the record (as may be reflected as a count field value of the data structures 200, 300, or 400 (not shown). In any case, when two or more of these criteria (here, key name value, date, and/or count) is matched between records in two data structures, the associated data is identified.

For example, the data structure 200 includes the MERCHANT_CATEGORY_HIERARCHY_ID of 422 for the second record with a BEGIN_DATE of Oct. 16, 2006. Similarly, the data structure 400 includes the MERCHANT_CATEGORY_HIERARCHY_ID of 422 for a second record with the BEGIN_DATE of Oct. 16, 2006. As such, each of the other fields/formats in the corresponding second records of the two data structures 200 and 400 is therefore identified to the other. Each corresponding line, row, record, etc. in the two data structures 200 and 400 may be identified to the other in a similar manner. It should be appreciated that if other records in data structure 400 had the same MERCHANT_CATEGORY_HIERARCHY_ID key name value (but different dates and counts), those records would not be identified to the second record in data structure 200, even though each record would have the same MERCHANT_CATEGORY_HIERARCHY_ID key name value of 422, based on use of the BEGIN_DATE and/or count field in the identification, to help ensure an appropriate correspondence.

It should also be appreciated that in the absence of a key name, such as MERCHANT_CATEGORY_HIERARCHY_ID, the validation engine 112 may identify data based on a date, such as an origin date (e.g., BEGIN_DATE, etc.) and a count (or number of occurrences) (e.g., MERCHANT_CATEGORY_CODE_COUNT) of the transactions. That is, for example, where the data structure includes authorization data for transactions facilitated through the payment network 104, for a given MCC, such as, for example, MCC 422, there should be a consistent count of the transactions between the data structure as each should include the same count of transactions for a given date. In addition to key name value and count, other suitable data points within the data structure 200, 300, or 400 or other data structures may be used to identify data between two data structures. However, as discussed above, in these example data structures 200, 300, and 400, a count field is not shown, because the records are detailed data records that are not representative of multiple records and, as such, a count field value would be 1. As such, the count need not necessarily be considered by the validation engine 112 in identifying records to one another, as the count (1 for each record in the example data structures 200, 300, and 400) does not particularly distinguish a record from any other record in the data structures 200, 300, and 400.

In addition, it should be appreciated that where data structures include different field names, as part of the comparison or identification, the validation engine 112 may use, or compile, a mapping of field names in one data structure to field names in one or more other data structures based on the data included therein (e.g., date and counts, etc.). The mapping may be employed, by the validation engine 112, in identifying the data in the disparate databases 108a-c.

It should also be appreciated that records may be identified to one another after normalizing the format/layout of data in one or more fields to help ensure accurate identification (or lack of identification) to one another. For example, where different date formats are utilized across the disparate databases 108a-c, format/layout for the date field may be normalized to a common format/layout in order to ensure proper identification. Specifically, for example, in the Oracle® data structure 200 of FIG. 2, the date fields (i.e., BEGIN_DATE, END_DATE, UPDATE_DATE) have a DATE format/layout, such that the dates for each record are formatted as DD-MONTH_ABRREVIATION-YYYY. In the Hadoop® data structure 300 of FIG. 3, the corresponding date fields have a STRING format/layout, such that the date may be formatted according to any suitable format (e.g., YYYY-MM-DD HH:MM:SS as shown in data structure 300, etc.). In the Netezza® data structure 400 of FIG. 4 the date fields have a TIMESTAMP format/layout, a format/layout for which the dates would typically be formatted as YYYY-DD-MM HH:MM:SS. That said, where the HH:MM:SS value is 00:00:00 (e.g., due to the data being imported from another date structure where the date format/layout does not include a time (e.g., Oracle® data structure 200, etc.), the data structure may only include the date (as opposed to both the date (YYYY-MM-DD) and the time (HH:MM:SS)), such that only the date is displayed with the TIMESTAMP format/layout (e.g., as in the case of the example Netezza® data structure 400). As such, normalization may help ensure proper identification (or lack thereof).

In any case, when the data is identified, the validation engine 112 then compares, at 606, the data which is associated with the key name value, date and/or count, etc. The comparison may extend to the value of each of the fields in the record of identified data (broadly, identified data), or to a format of each field in the identified record. The comparison is general based on the field names included in the data structure, where the values and/or layouts/formats for consistent field names are compared. For example, as between data structure 300 and data structure 400, the values and/or layouts/formats for the field names MERCHANT_CATEGORY_HIER_NAME, MERCHANT_MCC_GROUP_NAME, CLASSIFICATION_NAME, etc. will be compared according to one configuration of the validation engine 112. As mentioned above, when field names do not match, the validation engine 112 will compile and/or use a field name mapping, based on the data included in the data structure, to map different field names together. It should be appreciated that when the data is compared, formats/layouts (e.g., for date fields, etc.) may be normalized to ensure accurate comparison, consistent with the normalization discussed above.

When the data is compared, the validation engine 112 confirms validation of the data is complete, at 608, or potentially, generates a report indicating no errors were found. The report may, for example, be a file with a message that indicating that no errors or inconsistences were found (e.g., "0 records found," indicating that zero inconsistent records (with respect to data and formatting/layout) were found based on the matching, etc.). That said, it should be appreciated that the validation described herein does not necessarily validate that the data values across the various databases, data structures, fields, etc. are the correct values for what they purport to be. Rather, the validation confirms consistencies (or not) among two or more databases, data structures, fields, etc., such that the consistencies indicate that there is not a deviation in data values and/or layout/formatting among the various databases, data structures, field, etc.

Conversely, when one or more errors is found, based on the comparison, the validation engine 112 generates, at 610, a report, which indicates the one or more differences in the data and format/layout. In particular, FIGS. 7-10 include reports which correspond to the validation command parameters of Table 1.

FIG. 7 illustrates an exemplary report based on the comparison, by the validation engine 112, of the data structure 400 of FIG. 4 (Netezza®) with the data structure 300 of the FIG. 3 (Hadoop®). Included in the report are the differences between the data included in the respective databases 108b and 108c. As shown, for example, the report 700 notes that the validation engine 112 identified a difference in the values of the classification names (CLASSIFICATION_NAME) (e.g., AIRLINE^% and AIRLINE, etc.), which is indicative of unprintable characters or an errant load of data to the Hadoop® database 108b of FIG. 3. Further, the exemplary report 700 includes various errors in the data values and/or layout/format of the begin date (BEGIN_DATE), end date (END_DATE), and the update date (UPDATE_DATE), where the Hadoop® database 108b includes a STRING date layout/format (here, structured as YYYY-MM-DD HH:MM:SS), and the Netezza® database 108c includes the TIMESTAMP layout/format (here, displaying only the YYYY-MM-DD because there is no time data available). This is indicative of a load data issue associated with the Netezza® database 108c and/or a format definition of the Netezza® database 108c of FIG. 4.

Further, in connection with generating the exemplary report 700 of FIG. 7 (and the comparison leading to the generation thereof), it should be appreciated that the date format/layout for each data record of the Netezza® data structure 400 and Hadoop® data structure 300 was normalized prior to the comparison. Specifically, for example, the date format/layout for each data record (e.g., for the BEGIN_DATE, END_DATE, and UPDATE_DATE fields) was normalized to a YYYY-MM-DD HH:MM:SS TIMESTAMP format/layout (the more precise layout/format among the data fields of the two data structures) by the validation engine 112. It is noted that the date values for each record for the Netezza® data structure 400 were normalized to include 00:00:00 as the time data in the TIMESTAMP format/layout, since the actual time data does not exist for the date fields in the Netezza® data structure 400. As can be appreciated, had the dates been normalized to a less restrictive format (e.g., a DATE format/layout where time data is not accounted for, etc.), the validation engine 112 may not have detected an inconsistency among the data values in the two data structures 400 and 300.

Similarly, FIG. 8 includes an exemplary report 800 based on the comparison, by the validation engine 112, of the data structure 400 of FIG. 4 (Netezza®) with the data structure 200 of the FIG. 2 (Oracle®). Included in the report are the differences between the data included in the respective databases 108a and 108c. As shown, for example, the report 800 notes that the validation engine 112 identified a different in the values of the merchant category hierarchy name (MERCHANT_CATEGORY_HIER_NAME) (e.g., 5541 CANDY NUT CONFECTIONERY S versus 5441 CANDY NUT CONFECTIONERY STORES, etc.) and also the merchant category name (MERCHANT_CATEGORY_NAME) (e.g., EQUIPMENT RENTAL+ versus EQUIPMENT RENTAL+LEASING SVS FURNTURE-TOOL RENTAL, etc.), which is indicative of a truncation issue with the load of the respective data into the Oracle® database 108a of FIG. 2.

Further, in connection with generating the exemplary report 800 of FIG. 8 (and the comparison leading to the generation thereof), it should be appreciated that the date format/layout for each data record of the Netezza® data structure 400 and Oracle® data structure 200 was normalized prior to the comparison. Specifically, for example, the date format/layout for each data record (e.g., for the BEGIN_DATE, END_DATE, and UPDATE_DATE fields) was normalized by the validation engine 112 to a YYYY-MM-DD STRING format/layout (an equally precise format). However, it should be appreciated that it would have alternatively been suitable to normalize the date format/layout for each data record to a TIMESTAMP format/layout (an even more precise format). As can be appreciated, had the dates not been normalized, the validation engine 112 may have inadvertently found and reported inconsistences between the date values in corresponding records in the data structures 400 and 200 due to differences in format/layout, even though the date values for the corresponding records match.

FIG. 9 includes an exemplary report 900, which includes the layout or format differences between the data structure 400 and the data structure 300. As shown, the BEGIN_DATE field in the data structure 400 is of the type TIMESTAMP, while the BEGIN_DATE field of the data structure 300 is of the type STRING. Because these two types are different, the potential for a different value to be included is present, whereby this difference is reflected as an error included in the exemplary report 900. As another example, and stated another way, where a format/layout of a field is a number versus a character or text, loading the number 0002345 into the respective fields would result in either 2345 (a number) or 0002345 (a character/text). Because the 0's which are dropped by the number format may be significant, it is important, in such example, for the validation engine 112 to recognize the difference between the fields, which may be a product of the format of the field rather than the value loaded.

FIG. 10 includes an exemplary report 1000, which is based on a comparison of the data structure 400 to the data structure 200. The exemplary report, consistent with FIG. 9, illustrates a determined inconsistency between the formats/layouts of the two data structures.

In view of the above, the systems and methods herein permit validation across multiple databases in a unique manner that improves upon prior database validation processes, where years may be required to validate large data sets duplicated across disparate databases. For example, with the systems and methods herein, 58 billion transaction records may be validated for consistency by the validation engine in a matter of only two to three hours. This is in stark contrast to prior, conventional techniques for validating data for consistency, which may instead require days, months, or even years to account for such large amounts of data. In addition, validation is enabled herein without requiring manual comparison of data across disparate databases, manual notation of inconsistencies, and manual compilation of reports identifying the inconsistencies, as discussed above. By way the validation engine disclosed herein, the systems and methods provide improvements over such prior techniques in a manner that, at the least, automates (i) the comparison of data and formatting/layout in data structures that are assumed to be same, (ii) the identification of inconsistences therein, and (iii) the reporting of the identified inconsistencies. In connection therewith, the validation engine described herein provides greater efficiencies in the validation of database integrity and enables a time consuming technical process that was previously performed manually to be automatically performed based on validation command parameters (in a more efficient manner and in a much shorter amount of time).

Again and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein. As will be appreciated based on the foregoing specification, the above-described embodiments of the disclosure may be implemented using computer programming or engineering techniques including computer software, firmware, hardware or any combination or subset thereof, wherein the technical effect may be achieved by performing one or more of the following operations: (a) in response to a validation command including at least one validation command parameter, identifying, by a computing device, first data in a first data structure of a first database to second data in a second data structure of a different second database, the first data associated with a key name value and a date and the second data associated with the key name value and the date; (b) when identified, comparing, by the computing device, a value of the first data to a value of the second data; and then (c) generating, by the computing device, a report when one or more differences between the value of the first data and the value of the second data exists, the report indicative of the one or more differences in the value of the first data and the value of the second data, whereby a user associated with the validation command is permitted to take corrective action to avoid the one or more differences in the value of the first data and the value of the second data in one or more subsequent loads of data to the first database and/or the second database.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX A

```
###########################################################
#####################################################
##- Main
###########################################################
#####################################################
_rc=0
  _PGM_DIR=pgms/
  _OUTPUT_DIR=data/
  _LOG_DIR=logs/
  _TEMP_DIR=temp/
  _RPT_DIR=rpts/
  _SQL_DIR=sql/
###########################################################
#####################################################
VALIDATE ALL THE TABLES
###########################################################
#####################################################
  _MAX_CNT_SUB1=100000000 ### If OVER ALOT SUBSTRING THE FIELD - BASED ON META DATA
  _MAX_SIZ_SUB1=4      ### SUBSTRING SIZE WHEN OVER _SUBS_MAX
  _MAX_CNT_SUB2=20000000  ### WHEN OVER ALOT SUBSTRING THE FIELD - BASED ON META DATA
  _MAX_SIZ_SUB2=6      ### SUBSTRING SIZE WHEN OVER _SUBS_MAX
  _MAX_KEY_OUT=5000000    ### WHEN GETTING RID OF PROC_DATE OR ALL KEYS - BASED ON META DATA
  _MAX_ERR_OUT=250000  ### MAX NUMBER OF ERRORS CAN SEE IN OUTPUT
N For Netezza, H for Hadoop, and O for Oracle ALSO "NN" for Netezza to Netezza Hosts below (Hadoop to Hadoop is "HH" (not shown))
first is the DRIVER
  _PROC="NH"
Netezza to Netezza use these Hosts
  _NZ_HOST01=nps2ksc0
  _NZ_HOST02=nps2stl6
OVERWRITE THE PREVIOUSLY RUN DATA CHECKS is "Y" or "N"
  _OVERWRITE="Y"
  _QLINE1=" AND NTZ_DB IN ('core')"
  _QLINE2=" AND NTZ_TNAME LIKE ('CBD_DETAIL')"
  _QLINE3=" AND NTZ_FNAME IN
('PDS243_MCOM_ISS_RETR_REQUEST_DATE','PDS0895S4_ISS_GBL_CONV_RATE',
'PDS0895S6_ACQ_NET_RECON_AMT_BASE','PDS0895S9_ACQ_GBL_CONV_RATE',
'PDS0898S2_TXN_CURR_VAR_AMT','PDS0898S1_TXN_CURR_FIXED_AMT',
'PDS0898S3_BFR_CURR_FIXED_AMT','PDS863S4_CCM_RATE','PDS863S8_CBCM_RATE',
'PDS0898S3_BFR_CURR_FIXED_AMT','PDS863S10_CBFM_RATE',
'PDS0814S9_SND_MBR_AMT_CURR','PDS0816S1_MCCR_AMT_USD',
'PDS0818_BILL_MBR_ACTL_CON_RATE','PDS0835S5_SND_MBR_INTR_CHG_FEE',
'DW_EURO_NET_TXN_FEE','DW_EURO_NET_TXN_AMT')
"
  _QLINE4=""
  _QLINE5=""
  _SRNG=2018-01-01
  _ERNG=2018-07-19
  run_checks
  _QLINE1=" AND NTZ_DB IN ('core')"
  _QLINE2=" AND NTZ_TNAME LIKE ('CBD_DETAIL')"
  _QLINE3=""
  _QLINE4=""
  _QLINE5=""
  _SRNG=2018-01-01
```

APPENDIX A-continued

```
_ERNG=2018-06-30
 run_checks
FILL IN THE CRITERIA TO GO INTO THE IMPALA QUERY TO GET THE DATA
FOR VALIDATION
  _QLINE1=" AND NTZ_DB IN ('core')"
  _QLINE2=" AND (NTZ_TNAME NOT LIKE ("%_CURRENT_YR%') AND NTZ_TNAME
NOT LIKE ("%_PREVIOUS_YR%') AND NTZ_TNAME NOT LIKE ("%_2YRS_AGO%')
AND NTZ_TNAME NOT LIKE ("%_3YRS_AGO%') )"
  _QLINE3=" AND NTZ_TNAME NOT IN ('EVP_PARTCPTN')"
  _QLINE4=""
  _QLINE5=""
  _SRNG=2018-01-01
  _ERNG=2018-06-30
 run_checks
FILL IN THE CRITERIA TO GO INTO THE IMPALA QUERY TO GET THE DATA
FOR VALIDATION
  _QLINE1=" AND NTZ_DB IN ('addendums') "
  _QLINE2=""
  _QLINE3=""
  _QLINE4=""
  _QLINE5=""
  _SRNG=2018-01-01
  _ERNG=2018-06-30
 run_checks
  _QLINE1=" AND NTZ_DB IN ('core')"
  _QLINE2=" AND NTZ_TNAME LIKE ("%_CURRENT_YR%')"
  _QLINE3=""
  _QLINE4=""
  _QLINE5=""
  _SRNG=2018-01-01
  _ERNG=2018-06-30
 run_checks
  _QLINE1=" AND NTZ_DB IN ('core') "
  _QLINE2=" AND NTZ_TNAME LIKE ("%_PREVIOUS_YR%')"
  _QLINE3=""
  _QLINE4=""
  _QLINE5=""
  _SRNG=2017-01-01
  _ERNG=2017-12-31
 run_checks
  _QLINE1=" AND NTZ_DB IN ('core') "
  _QLINE2=" AND NTZ_TNAME LIKE ("%_2YRS_AGO%')"
  _QLINE3=""
  _QLINE4=""
  _QLINE5=""
  _SRNG=2016-01-01
  _ERNG=2016-12-31
# run_checks
  _QLINE1=" AND NTZ_DB IN ('core') "
  _QLINE2=" AND NTZ_TNAME LIKE ("%_3YRS_AGO%')"
  _QLINE3=""
  _QLINE4=""
  _QLINE5=""
  _SRNG=2015-01-01
  _ERNG=2015-12-31
# run_checks
refresh_tables
CHECKS AND FINAL REPORTS
 final_reporting
################################################################################
########################################################
#- End Main
################################################################################
########################################################
```

What is claimed is:

1. A system for use in validating data included in disparate databases, the system comprising:

a first database including a first data structure, the first data structure including first data, a key name value associated with the first data, and a date associated with the first data, the first data structure further including a first field defined by a first key name header and including the key name value;

a second database different from the first database, the second database including a second data structure, the second data structure including second data, the key name value associated with the second data, and the date associated with the second data, the second data structure further including a second field defined by a second key name header and including the key name value, wherein the first database is a different type of database as compared to the second database, and wherein the first key name header is different than the second key name header; and a computing device including a processor and coupled to the first database and the second database, the computing device configured, in response to a validation command including at least one validation command parameter, to:
select the first database and the second database for validation based on the at least one validation command parameter;
map the first key name header to the second key name header;
identify the first data to the second data based on the date and the key name value of the first data structure corresponding to the date and the key name value of the second data structure as defined by the mapping of the first key name header to the second key name header;
when identified, compare a value of the first data to a value of the second data; and then
generate a report when one or more differences between the value of the first data and the value of the second data exists, the report indicative of the one or more differences in the value of the first data and the value of the second data, whereby a user associated with the validation command is permitted to take corrective action to avoid the one or more differences in the value of the first data and the value of the second data in one or more subsequent loads of data to the first database and/or the second database.

2. The system of claim 1, wherein the computing device is further configured to receive the validation command from the user, the validation command including an SQL command.

3. The system of claim 1, wherein the first data and the second data include transaction data representative of at least one payment account transaction.

4. The system of claim 3, wherein the first data structure includes a first table having a first record including the key name value in the first field, the date, a third field, a fourth field and a fifth field; and
wherein the second data structure includes a second table having a second record including the key name value in the second field, the date, a third field, a fourth field and a fifth field; and
wherein in order to compare the value of the first data to the value of the second data, the computing device is configured to: compare a value of the third field of the first data structure to a value of the third field of the second data structure, compare a value of the fourth field of the first data structure to a value of the fourth field of the second data structure, and compare a value of the fifth field of the first data structure to a value of the fifth field of the second data structure.

5. The system of claim 4, wherein the computing device is configured to identify each of the first, third, fourth and fifth fields in the first data structure to the second, third, fourth and fifth fields in the second data structure based on a field name associated with the fields in the first and second data structures.

6. The system of claim 1, wherein the computing device is further configured to:
compare a format of the first data and a format of the second data; and
generate a report when one or more differences between the format of the first data and the format of the second data exists, wherein the report indicates the one or more differences in the formats, whereby the user associated with the validation command is permitted to take corrective action to avoid the one or more differences in the formats in one or more subsequent loads of data to the first database and/or the second database.

7. The system of claim 1, wherein the report further includes the first key name header of the first field and the second key name header of the second field.

8. A computer-implemented method for validating data included in disparate databases, wherein the disparate databases include a first database and a second database, the first database including a first data structure having a first field defined by a first key name header, the first data structure including first data, a key name value in the first field and associated with the first data, and a date associated with the first data, and the second database including a second data structure having a second field defined by a second key name header, the second data structure including second data, a key name value in the second field and associated with the second data, and a date associated with the second data, the method comprising:
in response to a validation command including at least one validation command parameter, selecting, by a computing device including a processor, the first database and the second database for validation based on the at least one validation command parameter, the first database being a different type of database than the second database;
identifying, by the computing device, the first data in the first data structure of the first database to the second data in the second data structure of the second database, based on the key name value and the date included in each of the first and second data structures and a mapping of the first key name header to the second key name header, the first key name header being different than the second key name header;
when identified, comparing, by the computing device, a value of the first data to a value of the second data; and then
generating, by the computing device, a report when one or more differences between the value of the first data and the value of the second data exists, the report indicative of the one or more differences in the value of the first data and the value of the second data, whereby a user associated with the validation command is permitted to take corrective action to avoid the one or more differences in the value of the first data and the value of the second data in one or more subsequent loads of data to the first database and/or the second database.

9. The method of claim 8, further comprising receiving the validation command from the user, the validation command including an SQL command.

10. The method of claim 8, wherein the first data and the second data include transaction data representative of at least one payment account transaction.

11. The method of claim 10, wherein the first data structure includes a first table having a first record including the key name value in the first field, the date associated with the first data, a third field, a fourth field and a fifth field; and
wherein the second data structure including a second table having a second record including the key name value in the second field, the date associated with the second data, a third field, a fourth field and a fifth field; and
wherein the method includes, in order to compare the value of the first data to the value of the second data:

comparing, by the computing device, a value of the third field of the first data structure to a value of the third field of the second data structure;

comparing, by the computing device, a value of the fourth field of the first data structure to a value of the fourth field of the second data structure; and comparing, by the computing device, a value of the fifth field of the first data structure to a value of the fifth field of the second data structure.

12. The method of claim 11, further comprising identifying, by the computing device, each of the first, third, fourth and fifth fields in the first data structure to the second, third, fourth and fifth fields in the second data structure based on a field name associated with the fields in the first and second data structures.

13. The method of claim 8, further comprising:

comparing, by the computing device, a format of the first data and a format of the second data; and generating, by the computing device, a report when one or more differences between the format of the first data and the format of the second data exists, wherein the report indicates the one or more differences in the formats, whereby the user associated with the validation command is permitted to take corrective action to avoid the one or more differences in in the formats in one or more subsequent loads of data to the first database and/or the second database.

14. The method of claim 8, wherein the report further includes the first key name header of the first field and the first key name header of the second field.

* * * * *